(12) United States Patent
Chaddock

(10) Patent No.: US 7,744,333 B2
(45) Date of Patent: Jun. 29, 2010

(54) APPARATUS AND METHOD FOR RETRIEVING, TRANSPORTING AND DELIVERING PORTABLE STORAGE UNITS

(75) Inventor: Scott T. Chaddock, St. Petersburg, FL (US)

(73) Assignee: Portable Storage Units, Inc., Clearwater, FL (US)

( * ) Notice: Subject to any disclaimer, the term of this patent is extended or adjusted under 35 U.S.C. 154(b) by 1084 days.

(21) Appl. No.: 11/351,898

(22) Filed: Feb. 10, 2006

(65) Prior Publication Data

US 2007/0189886 A1  Aug. 16, 2007

(51) Int. Cl.
*B60P 1/12* (2006.01)

(52) U.S. Cl. .................. 414/542; 414/495; 414/496; 414/498; 212/306

(58) Field of Classification Search ................. 414/495, 414/496, 497, 498, 662, 542; 212/306; 280/640
See application file for complete search history.

(56) References Cited

U.S. PATENT DOCUMENTS

| | | | |
|---|---|---|---|
| 2,504,232 A | 4/1950 | Smith | |
| 2,562,189 A | 7/1951 | Harris | |
| 2,730,249 A | 1/1956 | Edwards | |
| 2,751,095 A | 6/1956 | Haverstick et al. | |
| 2,778,512 A | 1/1957 | Strona | |
| 2,915,206 A | 12/1959 | Doswell | |
| 3,052,365 A | 9/1962 | Cameron | |
| 3,211,306 A | 10/1965 | Nissen et al. | |
| 3,448,875 A | 6/1969 | Robinson, Jr. | |
| 3,863,782 A | 2/1975 | Sandrock | |
| 4,187,048 A | 2/1980 | Bohlmann | |
| 4,297,071 A | 10/1981 | Dunbar | |
| 4,740,007 A * | 4/1988 | Lutz et al. | 280/408 |
| 4,806,060 A * | 2/1989 | Molski | 414/462 |
| 4,810,160 A * | 3/1989 | Emiliani et al. | 414/543 |
| 4,930,970 A | 6/1990 | Sunderland | |
| 4,978,272 A * | 12/1990 | Leon | 414/529 |
| 5,232,234 A * | 8/1993 | McCombs | 280/80.1 |
| 5,718,555 A | 2/1998 | Swalheim | |
| 5,720,400 A | 2/1998 | Altizer, Sr. | |
| 5,743,702 A | 4/1998 | Gunderson | |
| 5,862,926 A | 1/1999 | Johnson | |
| 6,071,062 A | 6/2000 | Warhurst et al. | |
| 6,155,770 A | 12/2000 | Warhurst | |
| 7,126,458 B2 * | 10/2006 | Trudeau et al. | 340/431 |

* cited by examiner

*Primary Examiner*—Michael S Lowe
(74) *Attorney, Agent, or Firm*—GrayRobinson, P.A.

(57) ABSTRACT

Disclosed is a vehicle that is employed in retrieving, transporting and delivering portable storage units ("PSUs"). The vehicle can achieve retrieval and/or delivery within tight spaces via telescopic frame and hoist assemblies. A rearward support assembly is included for stabilizing the entire apparatus during both retrieval and delivery. The vehicle can take the form of either a trailer or an integrated vehicle. The various components of the present invention, and the associated method will be described in greater detail hereinafter.

3 Claims, 8 Drawing Sheets

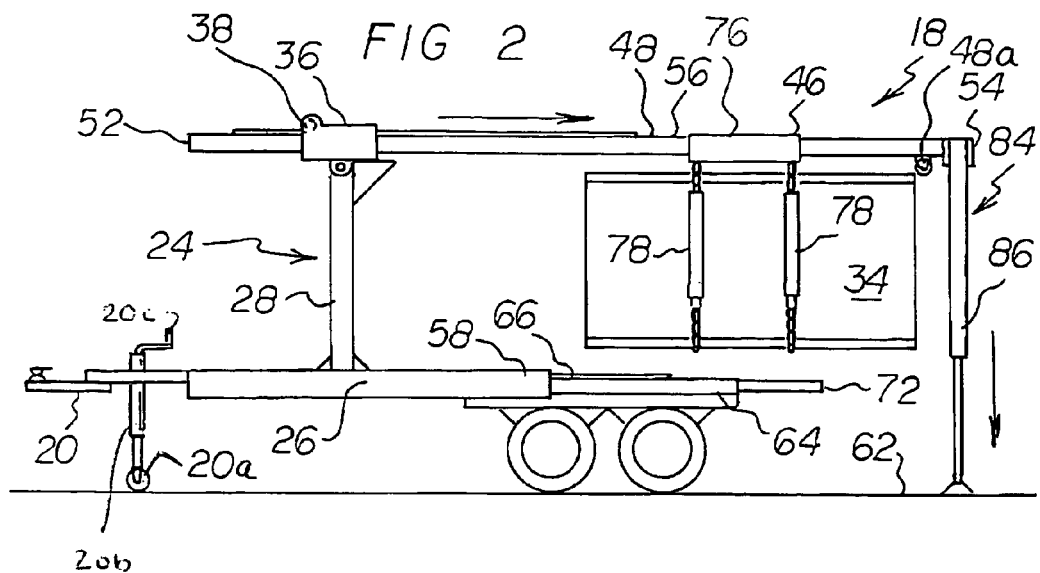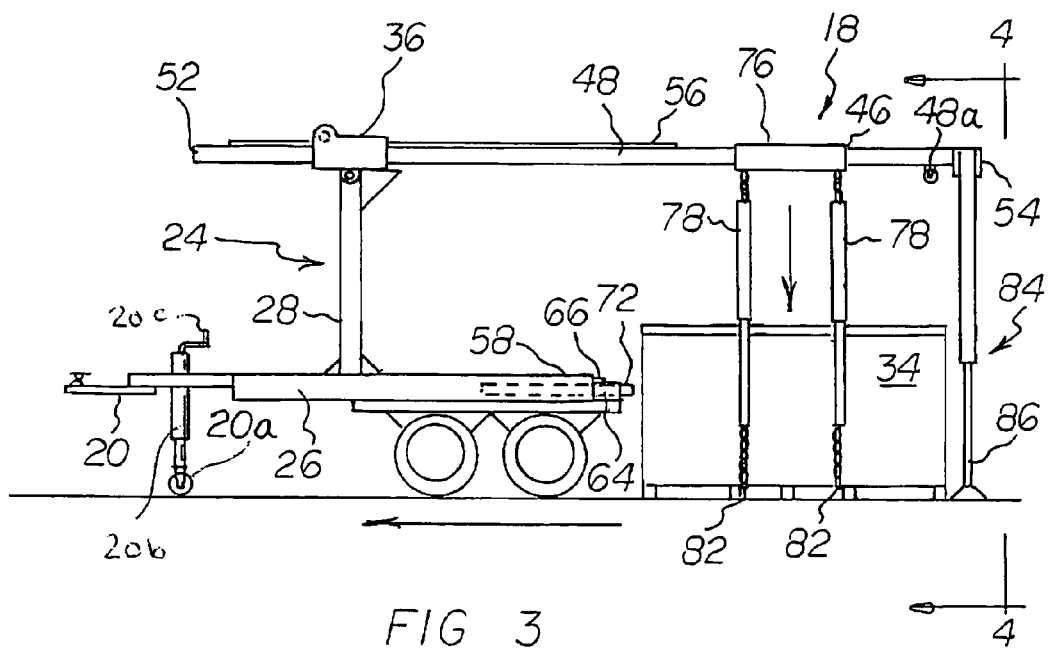

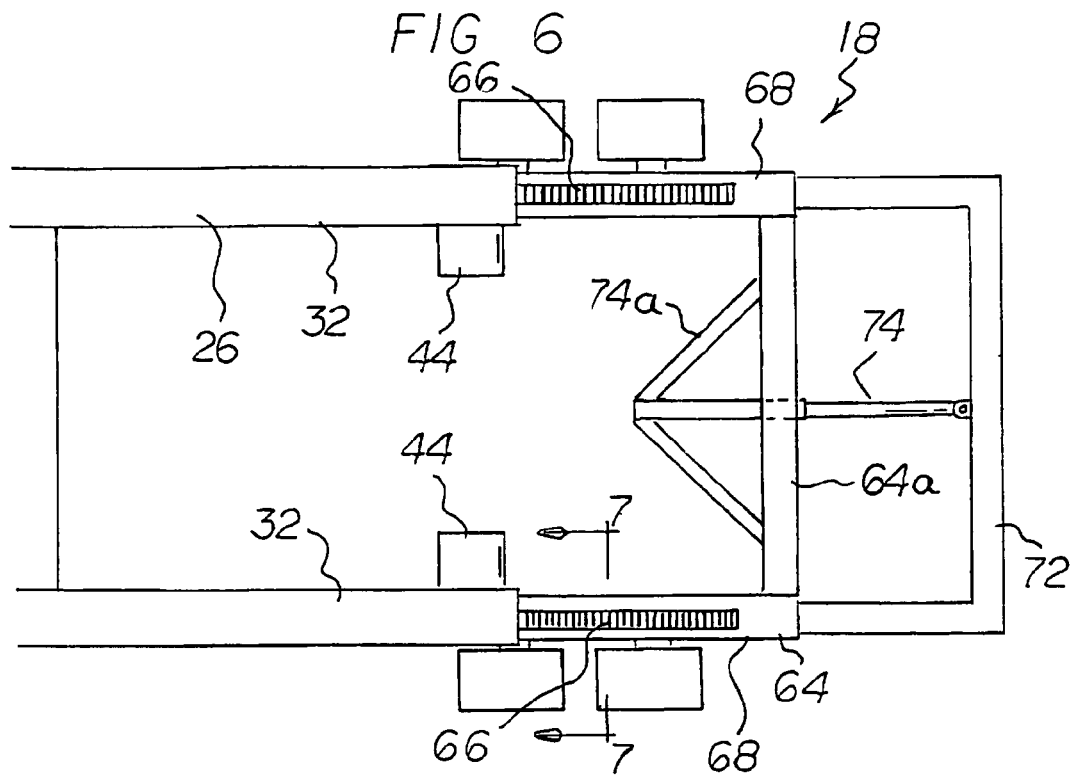
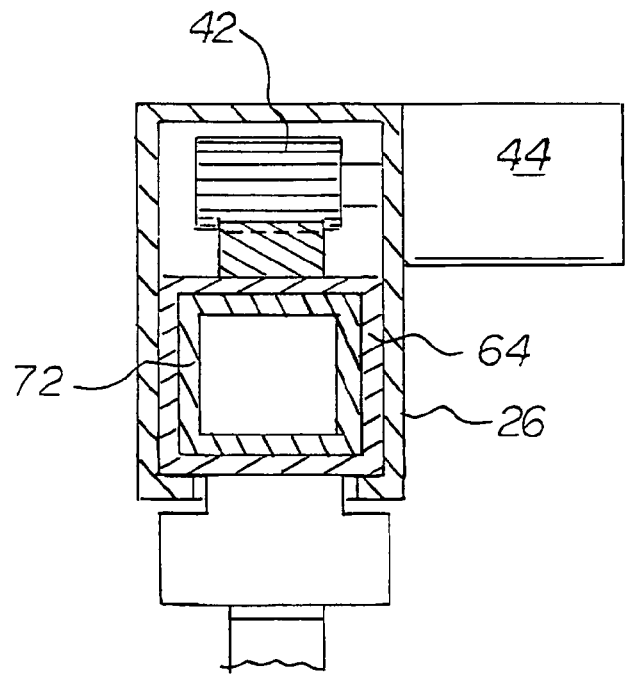

APPARATUS AND METHOD FOR RETRIEVING, TRANSPORTING AND DELIVERING PORTABLE STORAGE UNITS

BACKGROUND OF THE INVENTION

1. Field of the Invention

This invention relates to an apparatus and method for retrieving, transporting and delivering portable storage units. More particularly, the present invention relates to a vehicle that uses an extensible hoist and a retractable frame for the loading and unloading of storage units.

2. Description of the Background Art

The use of self-loading vehicles is known in the art. These devices typically employ hoists to deliver containers onto and off of a transport vehicle. Many different arrangements have been contemplated through the years. For instance, U.S. Pat. No. 2,504,232 to Smith discloses a self-loading apparatus for use with a truck. The apparatus includes a cable and hook that travel upon a trolley hanger positioned within a trolley rail. The truck uses pivotal legs as a means of support.

Another transport device is illustrated in U.S. Pat. No. 2,562,189 to Harris. The device of Harris is specifically for use in handling a burial vault. The device includes extendible legs that are adapted to be positioned over an excavation. Tracks and rollers are then used for positioning a hoist that is used in lowering a vault.

Another burial vault handling vehicle is illustrated in U.S. Pat. No. 2,915,206 to Doswell. This device utilizes a hoist frame that includes a beam that can be moved longitudinally to a position over an excavation. A hoist, which is coupled to the beam, is then utilized in lowering the vault.

Finally, U.S. Pat. No. 5,720,400 to Altizer discloses a portable hoist device for lifting and moving heavy loads short distances. The device includes a portable hoist and frame that can be disassembled for transport and reassembled at a desired location. The device further includes a carriage that is movable and positionable along the upper rails of the frame.

Although each of the above-referenced hoisting devices achieves its individual objective, they all suffer from common drawbacks. Namely, none of these hoists permit the delivery and/or transport of large containers with a minimum of human interaction or physical exertion. Furthermore, none of the prior devices allows containers to be picked up and delivered within tight quarters or difficult to access locations. The present invention is aimed at, among other things, overcoming the noted deficiencies in the referenced inventions.

SUMMARY OF THE INVENTION

In view of the foregoing, it is one of the objectives of this invention to enable a vehicle to deliver and retrieve large containers with little or no physical exertion on the part of the human operator.

It is also an object of this invention to allow containers of varying sizes and shapes to be quickly and efficiently picked up, transported and delivered.

Still another object of this invention is to permit containers to be maneuvered within tight spaces, such as driveways, side streets and alleyways.

Yet another object of the present invention is to provide an extensible hoist and a retractable frame that work together to allow storage units to be delivered and retrieved with as little space as possible.

These and other objects are achieved via an apparatus for retrieving, transporting and delivering portable storage units. The apparatus includes a support assembly consisting of a main frame and supports. A beam is also included that is slidably interconnected to the support assembly. An axle frame, which is supported by an axle and wheels, is telescopically interconnected to the main frame of the support assembly. The apparatus also includes a carriage assembly that is mounted to the beam and includes suspended cylinders for engaging the portable storage unit.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1-A is a top plan view taken along line 1A-1A of FIG. 1.

FIG. 1-B is a detailed view taken from FIG. 1A.

FIG. 2 is a side elevational view showing the apparatus delivering a portable storage unit.

FIG. 3 is a side elevational view showing the apparatus placing a portable storage unit upon the ground.

FIG. 6 is a top plan view of the main frame, axle frame and extension frame.

FIG. 7 is a cross sectional view taken along line 7-7 of FIG. 6.

Similar reference characters refer to similar parts throughout the several views of the drawings.

DETAILED DESCRIPTION OF THE PREFERRED EMBODIMENT

The present invention relates to a vehicle that is employed in retrieving, transporting and delivering portable storage units ("PSUs"). The vehicle can achieve retrieval and/or delivery within tight spaces via telescopic frame and hoist assemblies. A rearward support assembly is included for stabilizing the entire apparatus during both retrieval and delivery. The invention can take the form of either a tow vehicle and an attached trailer or simply an integrated vehicle. The various components of the present invention, and the associated method, will be described in greater detail hereinafter.

Figure 1:
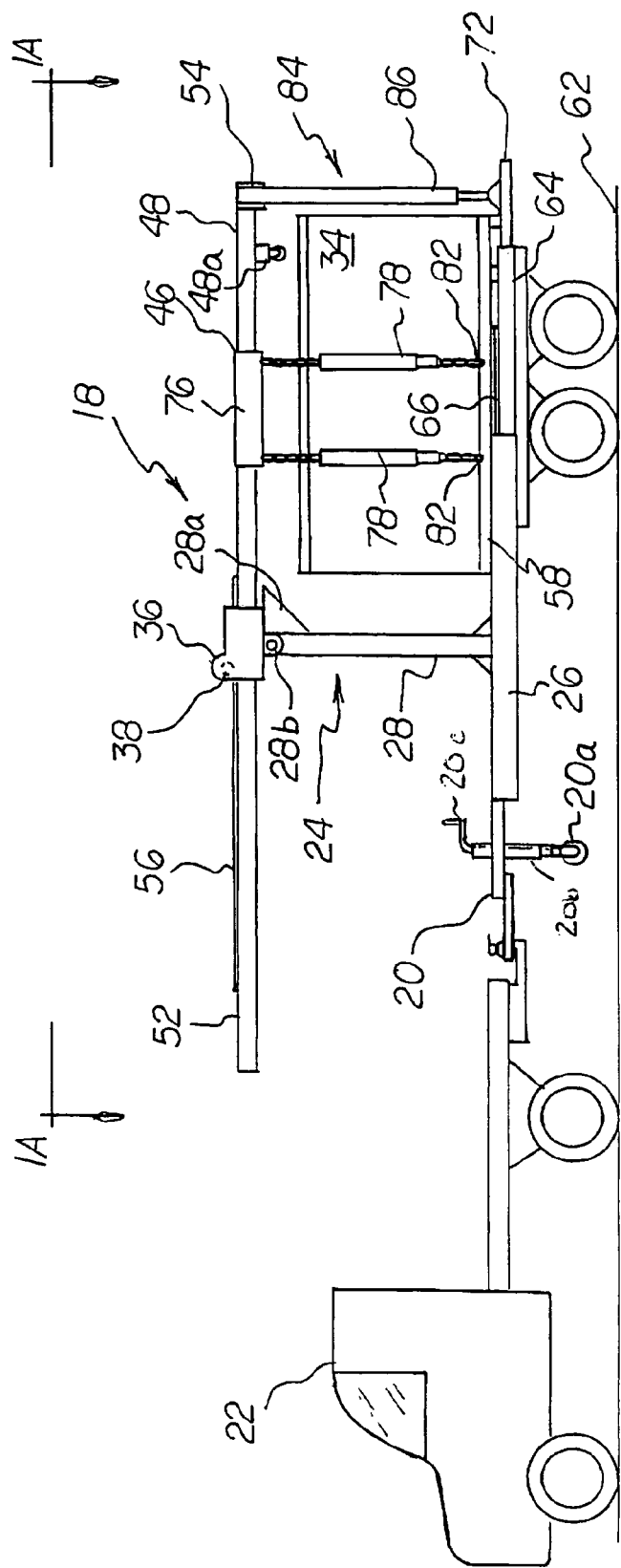
FIG. 1 is a side elevational view of the primary embodiment of the vehicle of the present invention.

With reference now to FIG. 1, a side elevational view of the apparatus 18 is disclosed in its primary embodiment. That is, apparatus 18 is included upon a trailer 20 that can be selectively coupled to a towing vehicle 22. Trailer 20 includes a support assembly 24 that is made up of a main frame 26 and a pair of opposing vertical spars 28, both of which are constructed from tubular steel members. Main frame 26, which is more clearly illustrated in the top plan view of FIG. 6, has opposing lateral subframes 32, each of which supports one of the vertical spars 28. Main frame 26 is preferably U-shaped with a closed forward end (adjacent the towing vehicle) and an opened rearward end at the rear end of trailer 20. In the preferred embodiment, spars 28 are vertically oriented at a 90° angle to main frame 26 and are high enough to accommodate the tallest PSUs 34 anticipated to be used with the apparatus 18. Of course, spars with differing configurations, and at varying angles to the trailer, can also be employed.

Figure 1A:
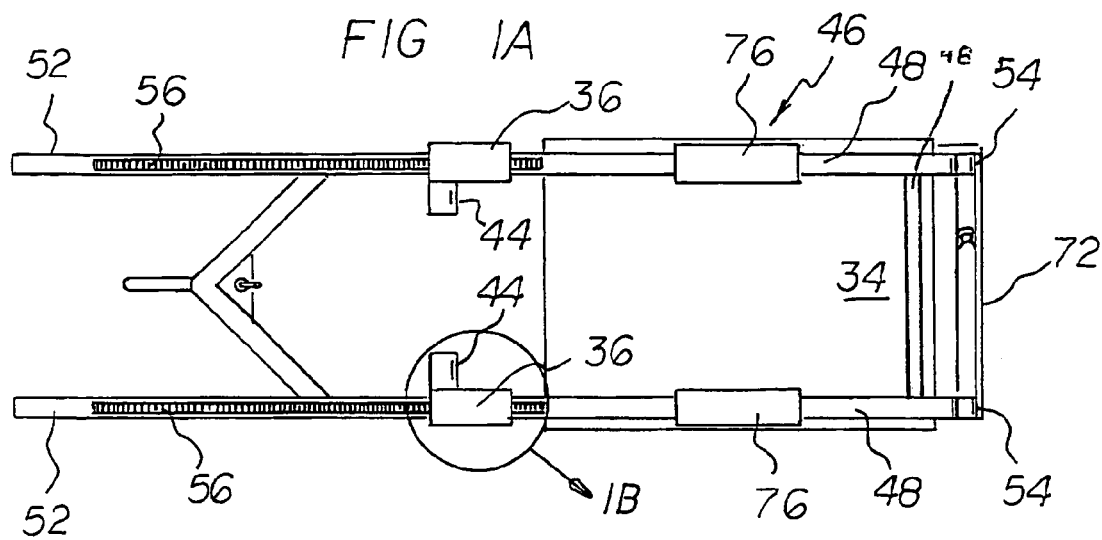
Figure 1B:
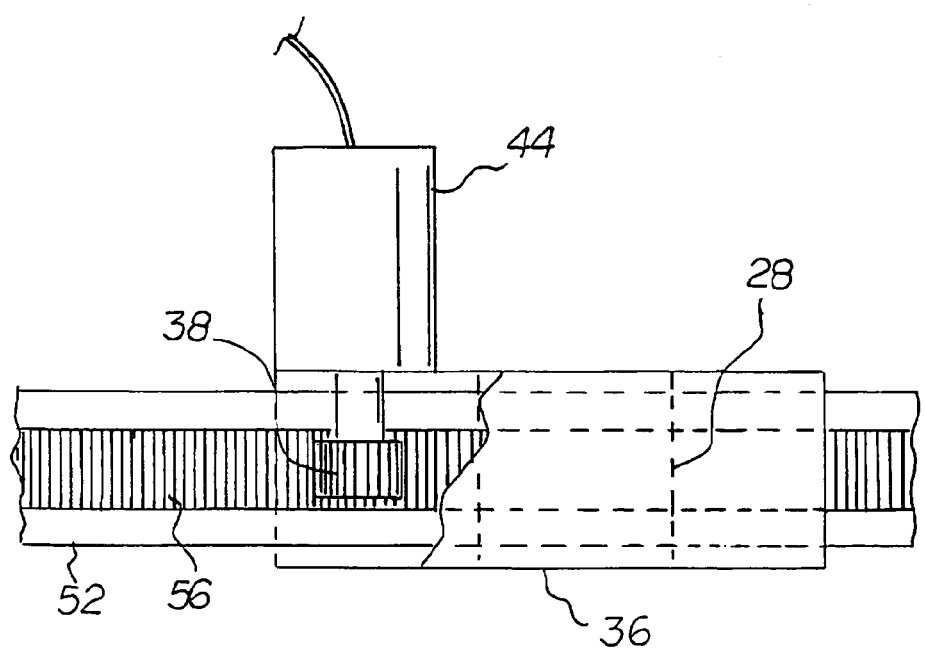

As illustrated in FIG. 1, each of the spars 28 includes a support sleeve 36 positioned at its uppermost end. Each of these support sleeves 36 includes an internal pinion gear 38 as noted in FIG. 1B. Similar pinion gears 42 are included within each side of main frame 26 as noted by the cross section of FIG. 7. Both Pinion gears 38 and 42 are driven by adjacent electric motors 44 (note FIGS. 1B and 7). The purpose of each of these pinion gears (38 and 42) is to drive an associated rack in a manner more fully described hereinafter. Although motors 44 are described as electrically powered, they can also be powered via a hydraulic motor. Thus, any of the electric motors described herein can be suitably powered via a hydraulic motor.

Apparatus 18 utilizes a hoist 46 to pick up and transport the PSUs 34. Hoist 46 is suspended by a pair of top beams 48 (note FIG. 1A), which, in turn, are supported by support sleeves 36 and spars 28. Each of these top beams 48 includes a forward and rearward end (52 and 54, respectively) and a rack 56 that extends along a substantial length of the beam. Each of these racks 56 engages a corresponding pinion gear 38 within one of the support sleeves 36. As noted above, these pinion gears 38 are driven by electric motors 44 (note FIG. 1B). Thus, each top beam 48 is slidably, or telescopically, interconnected to its corresponding support sleeve 36 in a rack and pinion engagement. An operator selectively delivers power to the pinion motor 44 to selectively position the top beams 48 forwardly or rearwardly of spars 28. This movement allows the hoist 46 to be selectively positioned over either the bed 58 of the trailer 20 or the ground 62. In the preferred embodiment, pinion gears 38 and associated electric motors 44 are synchronized with each other such that the two top beams 48 move in unison. By positioning the top beams 48 relative to the spar 28, hoist 46 can be maneuvered into position to pick up or deliver PSUs 34 as necessary. Operation of the motors 44 can be accomplished by an operator from within tow vehicle 22.

The next component of the present invention is an axle frame 64 (note FIG. 1). Axle frame 64 is supported by one or more rear axles and a corresponding number of wheels. As is known in the art, shock absorbers or leaf springs can be positioned intermediate the axles and associated frame. In the embodiment depicted in FIG. 1, axle frame 64 is supported by two axles and four wheels. However, it is within the scope of the present invention to use a different number of axles as is necessary. The number of axles and wheels used is a function of the anticipated size of the PSUs to be handled and the corresponding loads to be encountered by the vehicle. For standard sized PSUs, two axles and four wheels is sufficient.

One of the features of this primary embodiment is that axle frame 64 is telescopically received within a main frame 26. This allows the rear axles of apparatus 18 to be retracted towards the front of the towing vehicle 22. The telescopic relationship between the main and axle frames (26 and 64) is more clearly illustrated with reference to FIG. 6. As illustrated, the main and axle frames (26 and 64) are interconnected by a rack and pinion engagement. More specifically, racks 66 are included upon the upper surfaces of opposing subframes 68 of axle frame 64. Each of these racks 66 engages a corresponding pinion 42 within the subframes 32 of main frame 26 as noted in FIG. 7. Again, main frame pinions 42 and their associated electric motors 44 are synchronized such that a uniform movement is realized for each rack and pinion interconnection. This rack and pinion engagement allows an operator to selectively extend or retract the frame 64 relative to main frame 26. By retracting axle frame 64 inward toward the towing vehicle 22, hoist 46 can clear the back end of trailer 20 with less extension than would otherwise be possible. This allows PSUs to be deposited and retrieved from tight and difficult-to-access locations.

An additional extension frame 72 is telescopically received within axle frame 64 again as noted in FIG. 6. However, instead of a rack and pinion engagement, extension frame 72 is driven by a hydraulic cylinder 74, which is positioned between a cross bar 64a of axle frame 64 and extension frame 72. The support frame 74a is also included for retaining cylinder 74 in place. This support frame 74a fits between electric motors 44 when the axle frame 64 is retracted. Thus, when hydraulic cylinder 74 is extended, it extends extension frame 72 from the rear-end of axle frame 64. Conversely, retracting hydraulic cylinder 74 causes extension frame 72 to retract to a position within axle frame 64. As with axle frame 64, the retractability of extension frame 72 allows hoist 46 to clear the back end of trailer 20 with a minimum amount of extension. A suitable supply of hydraulic fluid and an associated pump (not shown) are stored within the vehicle to allow for the repeated extension and retraction of frame 72. Such operations can be controlled by an operator within tow vehicle 22. Although cylinder 74 is described as hydraulically powered, those skilled in the art will understand that the cylinder can be pneumatically powered via compressed air or electrically powered.

Hoist 46, or carriage assembly, is next described in conjunction with FIGS. 1 and 2. Carriage assembly 46 includes a pair of carriage sleeves 76 which slidably ride upon the two top beams 48. Specifically, each carriage sleeve 76 includes a powered pinion gear and an associated electric motor that engages a rack upon one of the two top beams 48. These powered pinions are similar to gears 38 and 42 and associated electric motors 44. Thus, the relationship between sleeves 76 and beam 48 is similar to the relationship between sleeves 36 and beam 48. Carriage sleeves 76 can therefore be positioned anywhere along the length of top beams 48 via a rack and pinion engagement. Again, the pinion gears are synchronized such that there is a uniform movement between sleeves 76. This arrangement allows both the top beams 48 and the carriage sleeves 76 to move independently relative to one another and relative to spars 28.

With continuing reference to FIG. 1, it will be evident that each carriage sleeve 76, in turn, supports a pair of downwardly extending carriage (or lifting) cylinders 78. These cylinders 78 are preferably suspended by a length of chain. Cylinders 78 are preferably hydraulically powered and telescopic, which allows each cylinder 78 to be selectively raised or lowered by an operator. The lowermost end of each carriage sleeve includes a hook 82, or other suitable engagement, that allows it to be secured to the bottom of the PSU 34. These hooks 82 are likewise preferably suspended from the bottom of cylinders 78 by a length of chain. When hooks 82 are secured and carriage cylinders 78 are retracted, PSU 34 is lifted from the bed 58 of the trailer 20 (note FIG. 2). Conversely, when carriage cylinders 78 are extended, PSU 34 can be deposited upon either bed 58 or ground 62.

Figure 4:
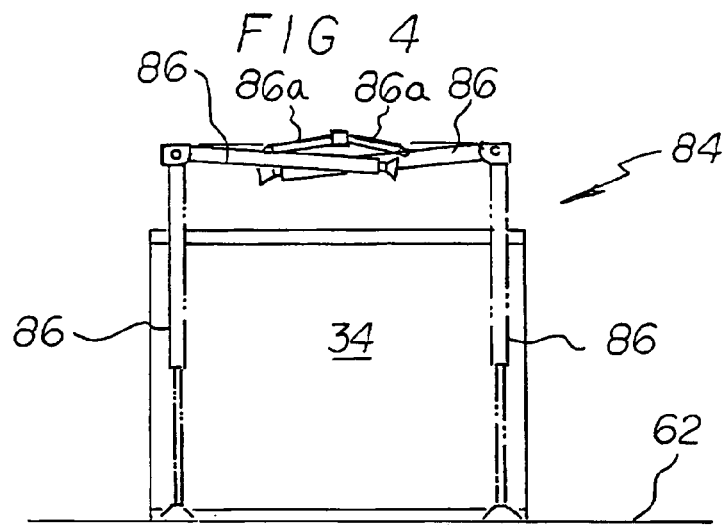
FIG. 4 is a rear elevational view taken along line 4-4 of FIG. 3 and illustrating two orientations of the support cylinders employed upon the apparatus.
Figure 5:
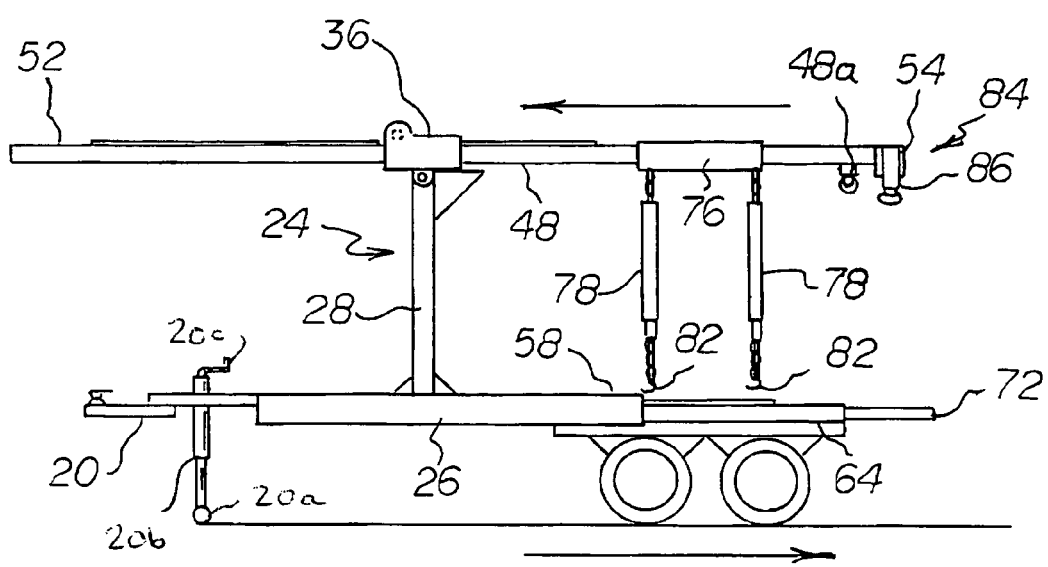
FIG. 5 is a side elevational view showing the apparatus after delivering a portable storage unit.

The next component of the vehicle is the support assembly 84. Support assembly 84 takes the form of a pair of hydraulically driven telescopic support legs 86, each of which is pivotally interconnected to the rear-end 54 of a corresponding top beam 48. This pivotal interconnection is most clearly illustrated with reference to FIG. 4. The pivoting of support legs 86 can be achieved by way of hydraulically powered links 86a. Specifically, extension of links 86a causes legs 86 to be vertically oriented relative to the ground (as noted in the dotted lines of FIG. 4); conversely, retracting links 86a results in legs 86 being brought upwardly into the orientation depicted in the solid lines of FIG. 4. Furthermore, each leg 86 is telescopic which allows the legs to be selectively engaged with either extension frame 72 or ground 62. In order to accommodate the possible over extension of legs 86 when they are engaging the ground 62, support sleeves 36 are pivotally connected to spars 28 via hinges 28(b). This arrangement allows beams 48 to pivot upwardly in the event of over extension of legs 86. Nonetheless, gussets 28a are included to prevent beams 48 from pivoting downwardly below a horizontal orientation.

A roller 48a is included in the trailer embodiment (note FIGS. 1-5). This roller 48a is a rotating bar that goes underneath and spans the two top beams 48. It should be as wide as possible to minimize the possibility of it sliding off the side of an underlying PSU 34. Roller 48a has an engaged orientation where it is pivoted or extended downwardly from the bars 48 and locked to permit contact with the upper surface of a PSU 34. Roller 48a also has a disengaged orientation where it is pivoted or retracted upwardly relative to bars 48 and locked so that the area can be occupied by a PSU 34. Having roller 48a pivot or retract allows the overall height of the invention to be less than would be possible if the roller were fixed.

When the top beams 48 are extended to the rear and the support legs 86 are retracted and pivoted inwardly, and when the axle frame 26 is retracted, then there is a danger of trailer 20 tipping rearwardly. Namely, the center of gravity would be such that trailer 20 would have a tendency to pivot about it axles. This tipping can be eliminated by including the roller 48a, which as illustrated in FIG. 1, is positioned towards the rear end of the top beams 48. When in the engaged orientation, roller 48a makes contact with and runs along the upper surface of the PSU 34 as the top beams 48 are moved forwardly or rearwardly.

Roller 48a serves two purposes. The first is to prevent the trailer from tipping rearwardly as noted above. This, in turn, prevents the legs 86 (once they are folded upwardly as noted by the solid lines of FIG. 4) and the top beams 48 from touching the upper surface of a container 34. This eliminates possible roof damage and also prevents the possibility of the legs 86 or top beams 48 from snagging, becoming hung up on, or getting trapped behind the roof of a PSU 34. In other words, roller 48a creates a sufficient amount of clearance to allow folded legs 86 and the beams 48 to be brought over the top of a PSU 34 without contacting the roof.

The second purpose is that by preventing tipping, rollers 48a ensure that the trailer support wheel 20a maintains contact with the ground 62. This is important because without contact you would not be able to drive the trailer using the hydraulic motor attached to the trailer support wheel 20a.

Although a roller 48a is described and depicted, all of these objectives can be realized by providing one or more wheels or one or more skids below the top beams 48. Although a roller 48a finds particular application with the trailer embodiment of FIGS. 1-5, it can likewise be employed when the invention is included upon an integrated vehicle. Although there is little tipping danger in such embodiments, rollers 48a would nonetheless prevent contact between the beams 48 or support legs 86 and the PSU 34.

METHOD OF THE PRESENT INVENTION

The method of employing the apparatus of the present invention is described next. FIG. 1 illustrates the apparatus configured for transporting PSU 34. This arrangement secures PSU 34 sufficiently for travel along roads and highways and allows PSU 34 to be delivered to its intended destination. In this configuration, the axle and extension frames (64 and 72) are extended relative to main frame 26 and support legs 86 are positioned upon extension frame 72. Additionally, top beams 48 are retracted relative to spars 28 and carriage assembly 46 is positioned over top of, and secured to, PSU 34.

Once the intended destination is reached, the vehicle 22 can be parked and trailer 20 can be unhitched. Trailer 20 can thereafter be positioned by a user via trailer support wheel 20a. Specifically, support wheel 20a can be extended downwardly to engage the ground via a hydraulically powered cylinder 20b. Wheel 20a is driven via a hydraulic motor to enable a single user to easily maneuver trailer 20. A handle 20c is also included to allow a user to manually steer trailer 20. Thus, by way of extension cylinder 20b, powered wheel 20a and steering handle 20c, trailer 20 can be easily positioned at a location that enables a PSU 34 to be picked up or deposited. The top beams 48 can be positioned forwardly of trailer 20 to shift the center of gravity and thereby ensure that wheel 20a engages the ground for proper traction. Shifting beams 48 either forwardly or rearwardly also permits trailer 20 to be maneuvered between obstacles such as trees or buildings.

An operator begins the unloading process by activating the hydraulics to retract the support legs 86 upwardly from bed 58. Legs 86 are then rotated inwardly via the hydraulic linkages 86a. Alternatively, legs 86 can be simply picked up off bed 58 a slight distance and moved rearwardly without the necessity of pivoting legs 86 inwardly. The pivoting of legs 86 is only necessary when the legs 86 have to clear the top of PSU 34. These operations can be achieved either in the cab of tow vehicle 22 or from a control panel located outside the vehicle.

In the next step, top beams 48 are slid rearwardly relative to spars 28. This is achieved by powering pinions 38 within support sleeves 36. Again, this operation is carried out by the operator via a control panel. This step of sliding top beams 48 rearwardly is achieved without disturbing the position of carriage sleeves 76. In other words, both top beams 48 and carriage sleeves 76 move independently of one another. This allows top beams 48 to move without the necessity of moving PSU 34, which is interconnected to top beams 48 via carriage sleeves 76. In order to accomplish this, as top beams 48 are moved rearwardly, sleeves 76 are moved forwardly a corresponding distance. Beams 48 are thus moved without PSU 34 being disturbed. Top beams 48 are extended rearwardly until support legs 86 are sufficiently clear of the rear end of trailer 20.

Thereafter, support legs 86 are pivoted and extended downwardly via linkages 86a until they engage ground 62. In this configuration, legs 86 serve to support the entire apparatus 18. In this configuration, PSU 34 is ready to be lifted by hoist 46. In the first lifting step, carriage cylinders 78 are retracted. Because cylinders 78 are interconnected to the bottom of PSU 34, this retraction results in PSU 34 being lifted above bed 58 of the trailer 20. Again, the stability of the vehicle is maintained by support legs 86.

Thereafter, the three frame members are sequentially retracted. Specifically, hydraulic cylinder 74 is retracted by the operator to bring extension frame 72 within the axle frame 64. Next, pinions 42 within subframes 32 of main frame 26 are operated to draw axle frame 64 within main frame 26. This retraction causes the rear axle of the vehicle to be moved towards the tow vehicle 22. This, in turn, allows PSU 34 to be deposited in the area previously occupied by axle frame 26 and extension frame 72. In this manner, PSUs can be delivered into spaces previously inaccessible by conventional self-loading vehicles.

Next, carriage sleeves 76 are moved rearwardly along top beams 48 via the electrically powered pinions. This movement positions the PSU 34 behind the rear of the trailer 20. Carriage cylinders 78 are then extended to place PSU 34 to the ground 62. The carriage cylinders 78 are then uncoupled from PSU 34. PSU 34 is now unloaded from the vehicle.

These steps are simply reversed in order to place the vehicle into a condition for travel. Namely, hooks 82 are uncoupled from PSU 34 and cylinders 78 are retracted upwardly. Carriage sleeves 76 can then be retracted back over top of vehicle bed 58. Thereafter, prior to beams 48 being retracted, legs 86 are retracted upwardly and pivoted inwardly to the orientation noted in FIG. 4. In this configuration, legs 86 can be brought over the top of the deposited PSU 34 during the retraction of top beams 48. Axle frame 64 and extension frame 72 can then be extended rearwardly into the uncollapsed orientation. Finally, legs 86 can be rotated and extended again to rest upon vehicle bed 58. The vehicle is now ready for transport.

Alternative Embodiments

Figure 8:
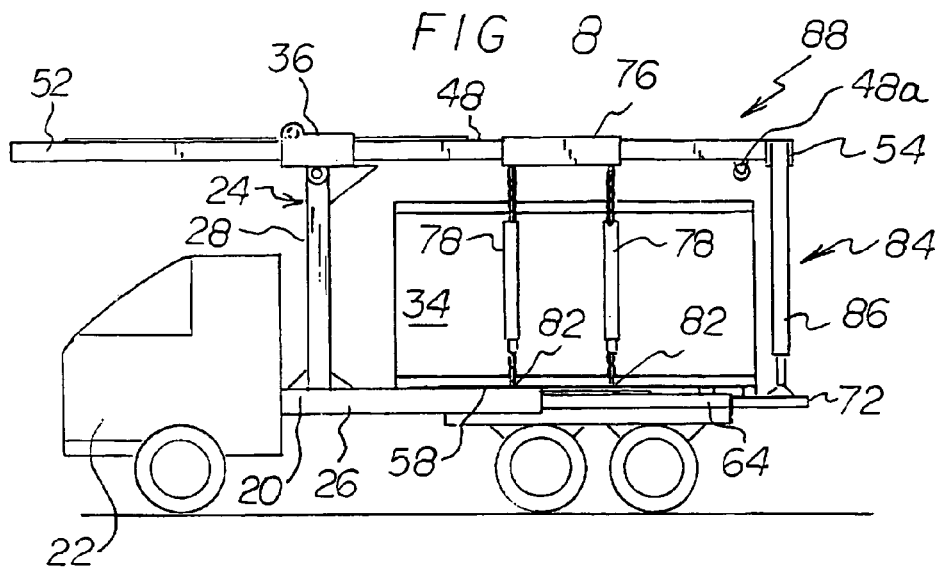
FIG. 8 is an alternative embodiment wherein the invention is included within an integrated vehicle.
Figure 9:
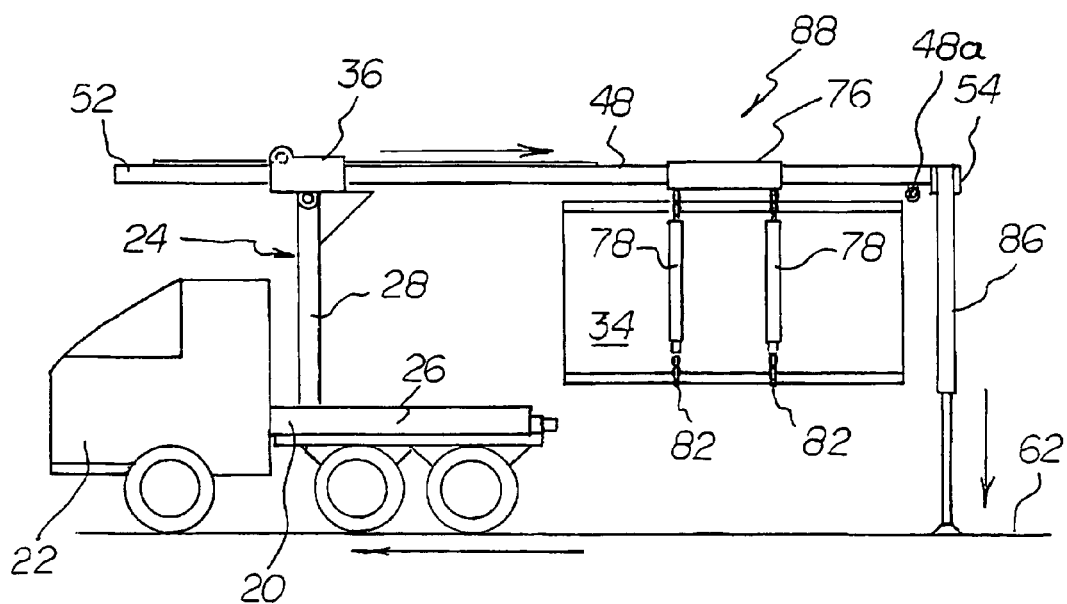
FIG. 9 is a view of the alternative embodiment of FIG. 8 delivering a portable storage unit.

The various alternative embodiments of the present invention are next described. One such alternative embodiment is illustrated in FIGS. 8-9. This embodiment is the same as the primary embodiment in all material respects; however, the invention is embodied in an integral vehicle 88. All other components are the same, including extensible frames 26, 64 and 72 and movable rear axles. Due to the movable axle frame 64 and movable rear axles, vehicle 88 would be a front wheel drive vehicle.

Figure 10:
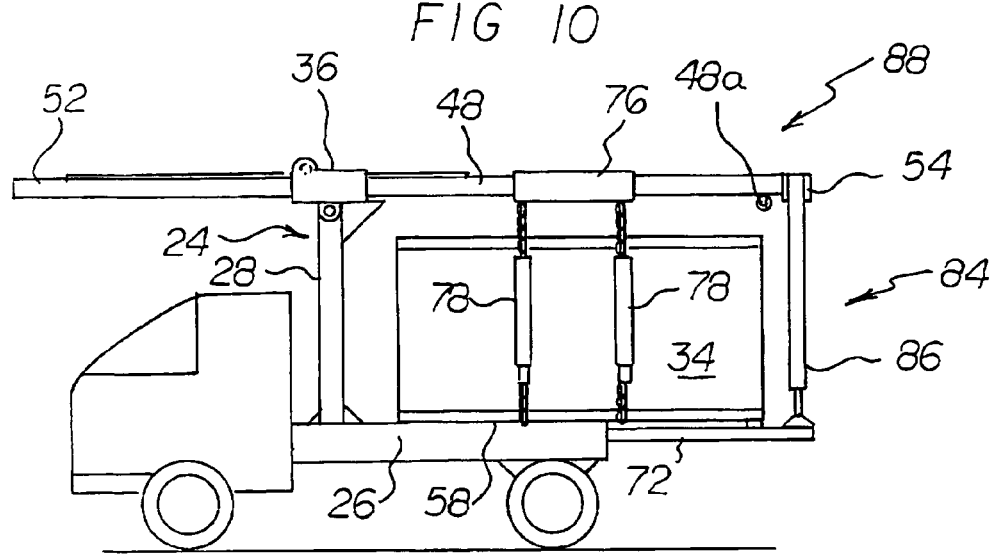
FIG. 10 is a view of another alternative embodiment employing a fixed rear axle.
Figure 11:
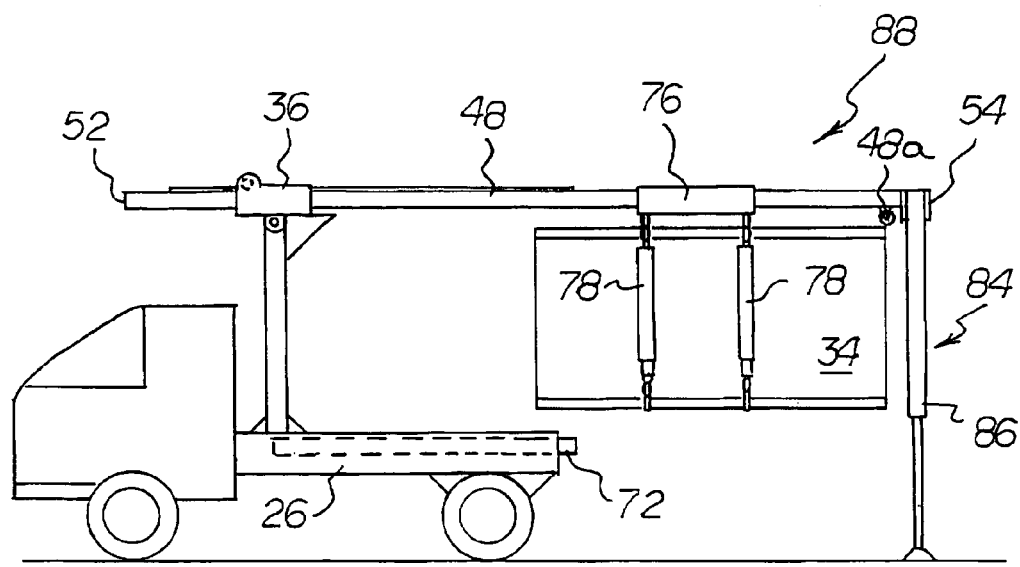
FIG. 11 is a view of the alternative embodiment of FIG. 10.

Yet another alternative embodiment is illustrated in FIGS. 10-11. In this vehicle 89, instead of three telescopic frames, there are two telescopic frames. Namely, extension frame 72 is telescopically received within main frame 26. Intermediate axle frame 64 is eliminated. This arrangement allows the rear axle to be fixed relative to main frame 26 and relative to the remainder of the vehicle 89. Thus, vehicle 89 is advantageous insomuch as it an be retrofitted to existing vehicles without the need for modifications to the rear axle assembly. Moreover, this embodiment can readily be used with a rear drive vehicle.

Figure 12:
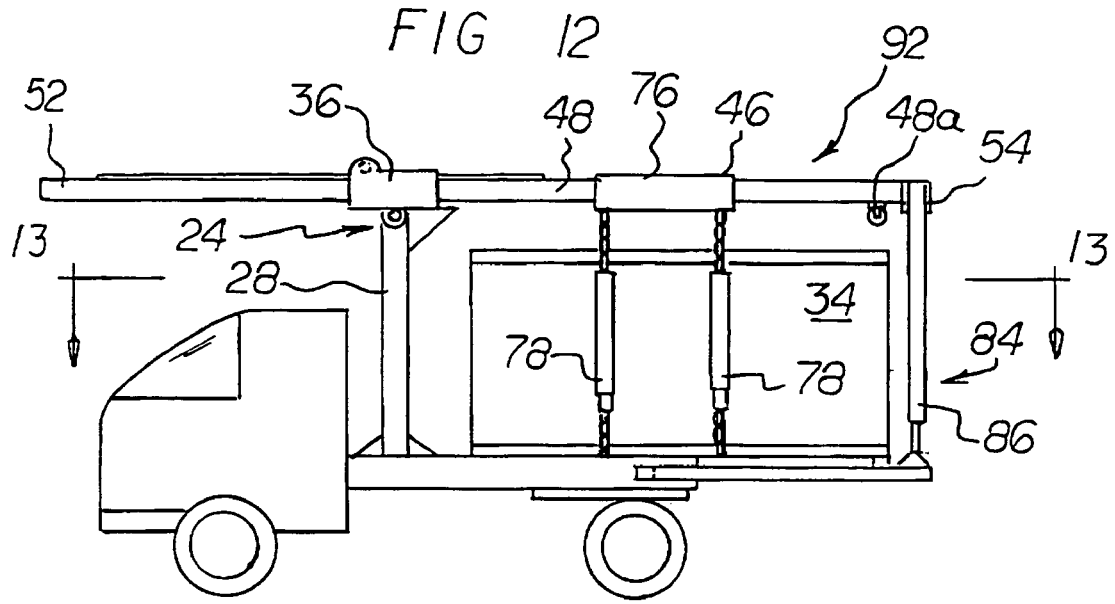
FIG. 12 is a view of yet another alternative embodiment employing support elements which expand or contract in a side to side manner.
Figure 13:
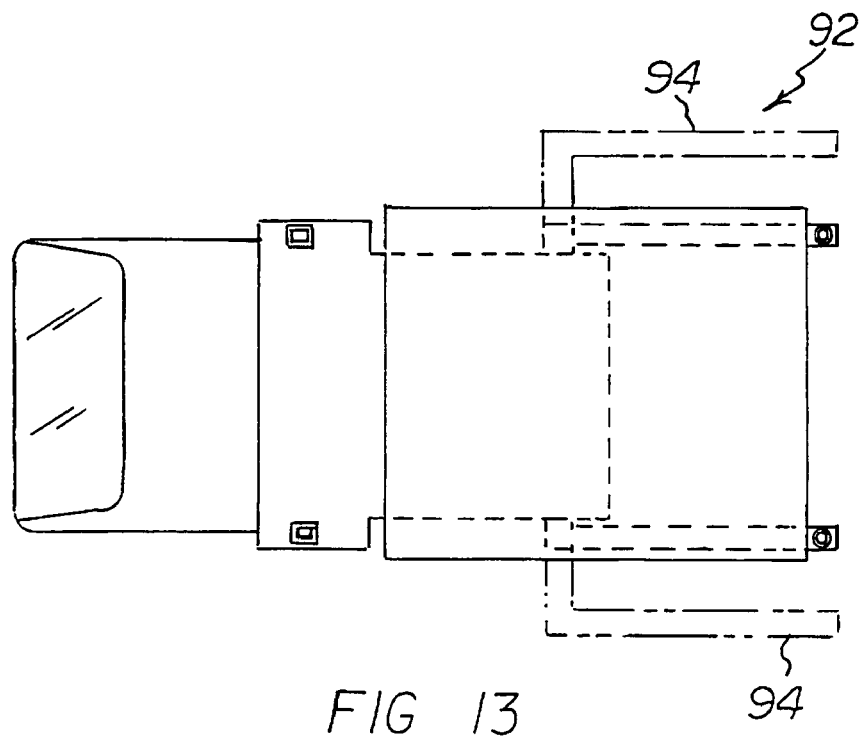
FIG. 13 is a view of the alternative embodiment of FIG. 12.

Yet, another embodiment is depicted in FIGS. 12-13. Here, instead of rearwardly extending frames, vehicle 92 includes side frames 94 that allow for side-to-side extension or retraction. Thus, when vehicle 92 arrives at its intended destination, PSU 34 is lifted via the hoist 46 as described above in conjunction with the primary embodiment. However, the two floor components 94 of vehicle 92 are slid laterally to expose the ground beneath. Thereafter, PSU 34 is lowered by hoist 46 as described above.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. An apparatus for retrieving, transporting and delivering a portable storage unit, the apparatus comprising:
    a support assembly including a main frame and a pair of vertical spars, a support sleeve at an uppermost end of each spar, each support sleeve including a pinion gear, the main frame including a pair of pinion gears;
    a pair of top beams each having a forward and a rearward end and a rack extending there between, the rack of each top beam engaging the pinion gear of a corresponding support sleeve such that the top beams are slidably interconnected to the support assembly;
    an axle frame supported by an axle and wheels, the axle frame including a pair of racks positioned opposite of one another at an upper surface of the axle frame, the racks engaging corresponding pinions within the main frame, such that the main frame and axle frame are telescopically interconnected;
    an extension frame telescopically interconnected to the axle frame, a hydraulic cylinder interconnected between the axle frame and extension frame;
    a carriage assembly including a pair of carriage sleeves, each of which supports a lifting cylinder, each carriage sleeve including a pinion that engages a corresponding rack upon one of the top beams to slidably interconnect the carriage sleeve to the said one of the top beams, the lifting cylinders each including a lowermost end that is adapted to engage the portable storage unit;
    a pair of telescopic support legs each of which is pivotally interconnected to the rear-end of a corresponding top beam, each support leg including a lowermost end that is adapted to selectively engage either the extension frame or the ground.

2. A method for delivering a portable storage unit comprising the following steps:
    retracting a pair of rear support legs upwardly to a position above an extension frame;
    sliding a pair of top beams rearwardly, the rear support legs being pivotally interconnected to rearward ends of the top beams;
    extending the pair of rear support legs downwardly until they engage the ground;
    retracting a set of lifting cylinders upwardly to a position above the extension frame, an axle frame and a main frame, the set of lifting cylinders supporting the portable storage unit and being slidably interconnected to the top beams by way of a pair of carriage sleeves;
    retracting the extension frame, into the axle frame and further retracting the axle frame into the main frame;
    sliding the carriage sleeves and the portable storage unit rearwardly along the top beams;
    extending the lifting cylinders downwardly until the portable storage unit engages the ground.

3. The method as described in claim 2 further comprising the step of extending a support leg downwardly to engage the ground prior to the lifting cylinder being retracted.

* * * * *